(12) United States Patent
Saito et al.

(10) Patent No.: US 8,131,428 B2
(45) Date of Patent: Mar. 6, 2012

(54) CONTROL MODULE FOR SEAT BELT RETRACTOR AND SEAT BELT RETRACTOR

(75) Inventors: Masashi Saito, Hitachinaka (JP); Hiroshi Ito, Hitachinaka (JP)

(73) Assignees: Hitachi Automotive Systems, Ltd., Hitachinaka-shi (JP); Takata Corp., Tokyo (JP)

( * ) Notice: Subject to any disclaimer, the term of this patent is extended or adjusted under 35 U.S.C. 154(b) by 550 days.

(21) Appl. No.: 12/262,858

(22) Filed: Oct. 31, 2008

(65) Prior Publication Data

US 2009/0132127 A1    May 21, 2009

(30) Foreign Application Priority Data

Nov. 20, 2007   (JP) ................. 2007-300236

(51) Int. Cl.
*B60R 22/46* (2006.01)
(52) U.S. Cl. ....... 701/45; 180/268; 242/374; 242/390.9; 280/806; 702/41
(58) Field of Classification Search ......... 73/862.381–862.391; 180/268, 180/281, 286; 242/374, 390.8–390.9; 280/806, 280/807; 297/474–480; 701/45–47; 702/41–43
See application file for complete search history.

(56) References Cited

U.S. PATENT DOCUMENTS

| | | | |
|---|---|---|---|
| 6,447,012 B2 * | 9/2002 | Peter et al. .................. 280/806 |
| 6,450,287 B1 | 9/2002 | Kurishige et al. | |
| 6,595,453 B2 * | 7/2003 | Durrstein et al. ......... 242/390.9 |
| 6,598,823 B1 | 7/2003 | Fujii et al. | |
| 6,676,056 B2 * | 1/2004 | Peter .......................... 242/374 |
| 6,935,590 B2 * | 8/2005 | Karwaczynski ......... 242/390.8 |
| 7,191,972 B2 * | 3/2007 | Peter .......................... 242/374 |
| 2001/0037907 A1 | 11/2001 | Peter et al. | |
| 2002/0125360 A1 | 9/2002 | Peter | |
| 2003/0066923 A1 | 4/2003 | Peter | |
| 2005/0083000 A1 * | 4/2005 | Specht et al. ............... 318/432 |
| 2005/0087387 A1 | 4/2005 | Ueda et al. | |
| 2006/0266575 A1 | 11/2006 | Nagase et al. | |

FOREIGN PATENT DOCUMENTS

DE    10 2005 034 185 A1    2/2007

(Continued)

OTHER PUBLICATIONS

European Search Report dated Mar. 18, 2011 (six (6) pages).

*Primary Examiner* — Paul N Dickson
*Assistant Examiner* — Laura Freedman
(74) *Attorney, Agent, or Firm* — Crowell & Moring LLP

(57) ABSTRACT

A control module for seat belt retractor capable of controlling a winding torque of a seat belt within a predetermined range, and such a seat belt retractor are provided. The seat belt retractor includes a spool 300 around which a seat belt for vehicle is wound, a motor 200 that causes the spool 300 to rotate, and a motor power transmission mechanism unit that couples the motor 200 and the spool 300. A microcomputer 400 uses a preset control parameter value to control a motor current that flows through the motor 200. The microcomputer 400 changes, based on the motor current and an output torque value of the spool, the control parameter value. The control parameter value is an apparent torque constant for each seat belt retractor product.

3 Claims, 11 Drawing Sheets

FOREIGN PATENT DOCUMENTS

| | | |
|---|---|---|
| JP | 02-290773 | 11/1990 |
| JP | 03-248960 | 11/1991 |
| JP | 2001-037280 (A) | 2/2001 |
| JP | 2001-122146 (A) | 5/2001 |
| JP | 2001-130377 A | 5/2001 |
| JP | 2001-187561 A | 7/2001 |
| JP | 2002-321597 A | 11/2002 |
| JP | 2003-191821 (A) | 7/2003 |
| JP | 2003-246257 (A) | 9/2003 |
| JP | 2004-243860 (A) | 9/2004 |
| JP | 2004-248466 (A) | 9/2004 |
| JP | 2005-130570 (A) | 5/2005 |
| JP | 2005-319971 (A) | 11/2005 |
| JP | 2006-89037 A | 4/2006 |
| JP | 2006-175997 (A) | 7/2006 |
| JP | 2007-008447 (A) | 1/2007 |
| JP | 2007-500647 (A) | 1/2007 |
| JP | 2007-161140 | 6/2007 |
| JP | 2007-245855 (A) | 9/2007 |
| JP | 2007-300236 (A) | 11/2007 |
| JP | 2008-024133 (A) | 2/2008 |
| JP | 2008-230537 (A) | 10/2008 |
| WO | WO 2005/016707 A1 | 2/2005 |
| WO | WO 2007/092307 A9 | 8/2007 |

* cited by examiner

FIG. 7

| Case | Current sensor 412 | Mechanism unit (Motor 200 + Motor power transmission mechanism unit) | Apparent torque constant |
|---|---|---|---|
| 1 | A (Measurement error +5%) | A (Torque constant 1.05) | 1 (=1.05/(1+5%)) |
| 2 | B (Measurement error −5%) | B (Torque constant 0.95) | 1 (=0.95/(1−5%)) |
| 3 | A (Measurement error +5%) | B (Torque constant 0.95) | 0.90 (= 0.95 /(1+5%)) |
| 4 | B (Measurement error −5%) | A (Torque constant 1.05) | 1.11 (=1.05/(1−5%)) |
| 5 | B (Measurement error −0%) | A (Torque constant 1.05) | 1.05 (=1.05/(1−0%)) |

CONTROL MODULE FOR SEAT BELT RETRACTOR AND SEAT BELT RETRACTOR

BACKGROUND OF THE INVENTION

1. Field of the Invention

The present invention relates to control modules for seat belt retractor and seat belt retractors, and more particularly to an electric-driven control module for seat belt retractor that winds a seat belt using a motor and such a seat belt retractor.

2. Background Art

Conventionally, as a seat belt retractor, an electric-driven seat belt retractor is known that winds a seat belt using a motor (see JP Published Patent Application No. 2001-187561 A, JP Published Patent Application No. 2006-89037 A, JP Published Patent Application No. 2002-321597 A, and JP Published Patent Application No. 2001-130377 A, for example).

In general, judging that there is a high possibility of a vehicle colliding with an obstacle, an instruction is input to a control circuit of a seat belt retractor so as to wind a seat belt. In accordance with this winding instruction, the control circuit feeds a driving current so that a predetermined winding torque is generated at the motor, thus making the seat belt wound around a spool. This lets a passenger of the vehicle closer to a seat so that there is substantially no space therebetween, thus enabling to reduce shock to the passenger when the vehicle collides with the obstacle.

SUMMARY OF THE INVENTION

When the seat belt is wound by the motor, the torque for winding is required to be within a predetermined range (e.g., 250 Nm to 300 Nm). When the torque exceeds this predetermined range, the passenger in the vehicle is pressed against the seat so as to feel tightness due to the seat belt. When the torque falls below the predetermined range, it becomes insufficient to press the passenger to the seat, thus causing a space therebetween and lessening the effect of reducing shock at the time of vehicle collision.

Conventionally, however, it is relatively difficult to control the winding torque of the seat belt to be within a predetermined range (e.g., 250 Nm to 300 Nm). The following describes the reason thereof. For instance, even when a motor current is controlled so that the driving torque of 275 Nm can be output, the resultant torque may be larger or smaller beyond the predetermined range (e.g., 250 Nm to 300 Nm) due to various factors. The factors causing the error of the winding torque are as follows:
an error in a current sensor circuit;
an individual difference of a torque constant in a motor;
an individual difference of efficiency in a motor power transmission mechanism unit; and
a temperature change in a magnetomotive force of a motor magnet.

A seat belt retractor for vehicle is required to operate normally within a wide temperature range (e.g., −40° C. to +85° C.). Such a temperature change affects the temperature change in a magnetomotive force of a motor magnet. A motor magnet, which is generally made of powdery sintered magnet, has a property of a magnetic power thereof decreasing with an increase of temperature, which results in a decrease of output torque from the motor. A decrease of temperature causes an increase of output torque from the motor. To cope with this, a temperature sensor that detects the motor temperature may be used for temperature compensation, for example. However, there are some problems as to where to place the temperature sensor at the motor for precise temperature detection, and a wiring being required from the temperature sensor to a control circuit, thus making it difficult to realize it. Meanwhile, even when the ambient temperature around the seat belt retractor for vehicle changes within the range of −40° C. to +85° C., for example, the magnetomotive force of the motor magnet changes about several percentages. A resistance of an armature winding of the motor also changes with a temperature, where the winding resistance increases with an increase of temperature, thus decreasing the output torque of the motor. This temperature change in the winding resistor, however, can be corrected by feedback control of the motor current.

Thus, if the other factors do not cause a change of the winding torque, and if the winding torque at a normal temperature (+25° C.) can be set at an intermediate value (e.g., 275 Nm) of a predetermined range (e.g., 250 Nm to 300 Nm), then even when the temperature changes within a range of −40° C. to +85° C., the winding torque can be within a predetermined range (e.g., 250 Nm to 300 Nm).

In view of such points of view, it is an object of the present invention to provide a control module for seat belt retractor capable of controlling a winding torque of a seat belt within a predetermined range, and such a seat belt retractor.

(1) In order to fulfill the above-stated object, a control module for seat belt retractor of the present invention controls a seat belt retractor, and the seat belt retractor includes: a winding mechanism that winds a seat belt for vehicle, the winding mechanism including a rotational shaft; a motor that causes the rotational shaft to rotate; and a gear mechanism that mechanically couples the motor with the rotational shaft. The control module includes: a control unit that controls a motor current that flows through the motor using a preset control parameter value; and change means that changes, based on the motor current and an output torque value of the rotational shaft, the control parameter value.

With this configuration, a winding torque of the seat belt can be controlled within a predetermined range.

(2) In the above (1), preferably, the control unit feed-back controls the motor current so as to reduce a difference between a target current calculated based on a target torque for the motor and the motor current detected by a current sensor. The control parameter value includes an apparent torque constant for each seat belt retractor product. The control unit calculates, based on the target torque and the apparent torque constant for each seat belt retractor product, the target current.

(3) In the above (2), preferably, the apparent torque constant for each seat belt retractor product corrects a variation in each current sensor product making up the seat belt retractor.

(4) In the above (3), preferably, the apparent torque constant for each seat belt retractor product further corrects an individual difference of a torque constant of the motor and an individual efficiency difference of the gear mechanism making up the seat belt retractor.

(5) In order to fulfill the above-stated object, a control module for seat belt retractor of the present invention controls the seat belt retractor. The seat belt retractor includes: a winding mechanism that winds a seat belt for vehicle, the winding mechanism including a rotational shaft; a motor that causes the rotational shaft to rotate; and a gear mechanism that mechanically couples the motor with the rotational shaft. The control module includes: a control unit that controls a motor current that flows through the motor using a control parameter value preset for each seat belt retractor product.

With this configuration, a winding torque of the seat belt can be controlled within a predetermined range.

(6) In order to fulfill the above-stated object, a seat belt retractor of the present invention includes a winding mechanism that winds a seat belt for vehicle, the winding mechanism including a rotational shaft; a motor that causes the rotational shaft to rotate; a gear mechanism that mechanically couples the motor with the rotational shaft; and a control circuit that controls a motor current that flows through the motor using a preset control parameter value. The control circuit includes change means that changes, based on the motor current and an output torque value of the rotational shaft, the control parameter value.

With this configuration, a winding torque of the seat belt can be controlled within a predetermined range.

Effects of the Invention

In accordance with the present invention, the winding torque can be controlled within a predetermined range.

BRIEF DESCRIPTION OF THE DRAWINGS

FIG. 7 explains error correction for output torque in a seat belt retractor according to one embodiment of the present invention.

DESCRIPTION OF A PREFERRED EMBODIMENT OF THE INVENTION

In the following, the configuration and the operation of a seat belt retractor according to one embodiment of the present invention is described with reference to FIGS. 1 to 12.

Firstly, the configuration of a collision-safety device for vehicle using the seat belt retractor according to the present embodiment is described with reference to FIG. 1.

Figure 1:
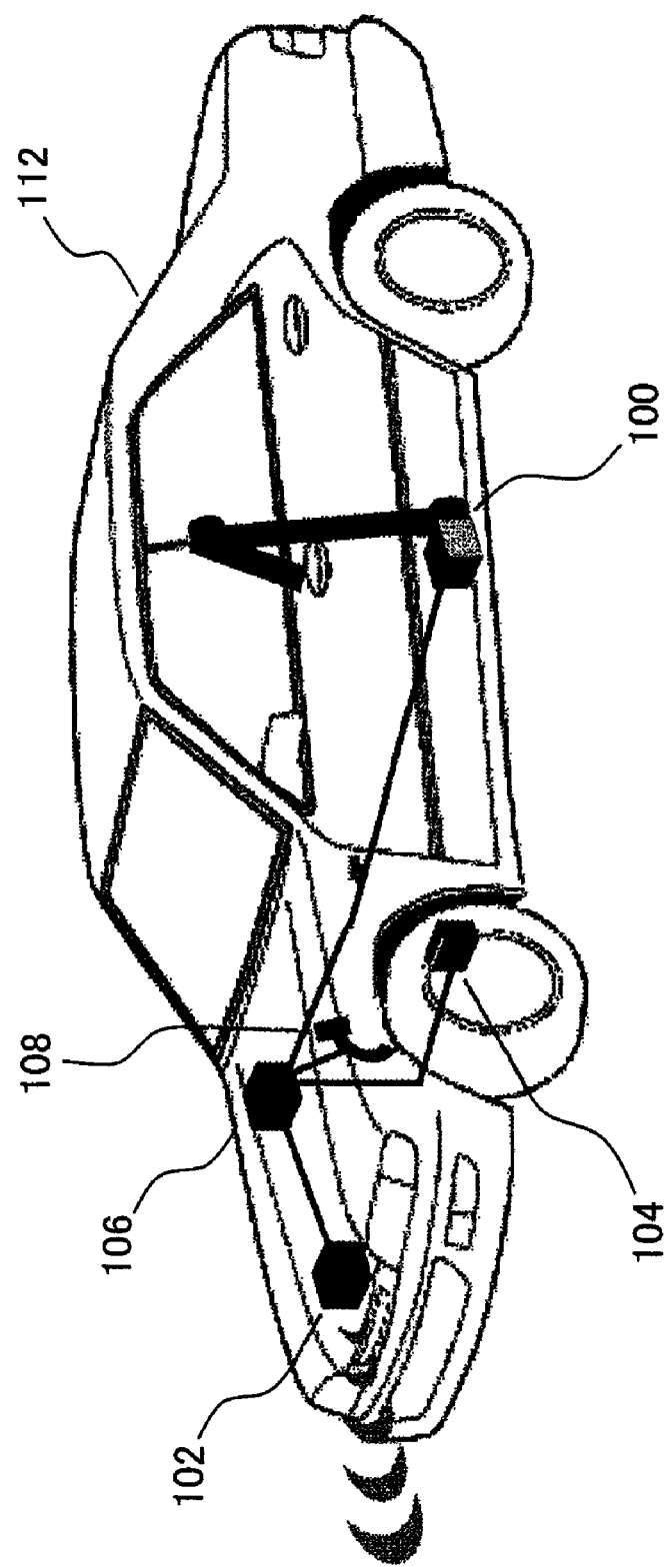
FIG. 1 is a perspective view showing the configuration of a collision-safety device for vehicle using a seat belt retractor according to one embodiment of the present invention.

FIG. 1 is a perspective view showing the configuration of the collision-safety device for vehicle using the seat belt retractor according to one embodiment of the present invention.

At a front part of a vehicle 112, an obstacle sensor 102 is attached, which outputs a signal in accordance with a distance from an obstacle. The signal output from the obstacle sensor 102 is transmitted to a collision-judgment controller 106 electrically connected with the obstacle sensor 102. A signal from a wheel-speed sensor 104, which outputs the signal in accordance with a vehicle speed, also is transmitted to the collision-judgment controller 106 electrically connected with the wheel-speed sensor 104.

In accordance with the signals from the obstacle sensor 102 and the wheel-speed sensor 104, the collision-judgment controller 106 judges whether the vehicle 112 collides with an obstacle or not. For instance, if a distance from the obstacle obtained based on the signal output from the obstacle sensor 102 is shorter than a predetermined value, and if a vehicle speed obtained based on the signal output from the wheel-speed sensor 104 is larger than a predetermined value, the collision-judgment controller 106 judges that the vehicle 112 will collide with the obstacle. When the collision-judgment controller 106 judges that the vehicle will collide with the obstacle, the collision-judgment controller 106 outputs an instruction signal to a brake-assist device 108 and an electro-mechanically integrated seat belt retractor 100 before the collision of the vehicle 112 with the obstacle.

The brake-assist device 108 and the electro-mechanically integrated seat belt retractor 100 are electrically connected with the collision-judgment controller 106. In accordance with the instruction signal from the collision-judgment controller 106, the brake-assist device 108 applies a brake, for example. In accordance with the instruction signal from the collision-judgment controller 106, the electro-mechanically integrated seat belt retractor 100 winds the seat belt, for example.

Figure 2:
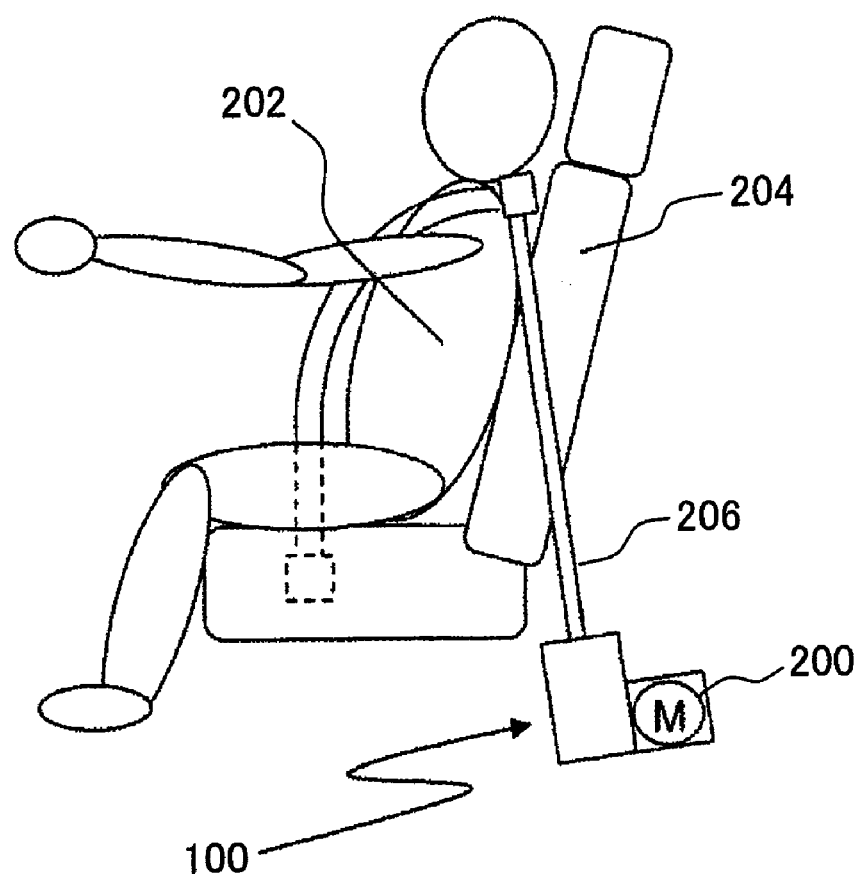
FIG. 2 explains a restraining state of a passenger to a seat by a seat belt retractor according to one embodiment of the present invention.

Referring now to FIG. 2, a restraining state of a passenger to a seat by the seat belt retractor of the present embodiment is described below.

FIG. 2 explains the restraining state of a passenger to a seat by the seat belt retractor according to one embodiment of the present invention. The same reference numerals as those in FIG. 1 denote the same parts.

The electro-mechanically integrated seat belt retractor 100 includes a motor 200 therein so that the rotation of the motor 200 causes a seat belt 206 to be wound. As the motor 200, a direct-current motor or a brushless motor can be used. For instance, the following considers the case where when a passenger 202 drives the vehicle 112, the passenger 202 slightly moves forward of the vehicle, generating a gap between the passenger 202 and a seat 204. In such a state, if the vehicle 112 collides with an obstacle, the passenger may be hit against the seat 204 because the passenger is not restrained to the seat 204.

According to the present system, however, the motor 200 included in the electro-mechanically integrated seat belt retractor 100 allows the seat belt 206 to be wound before the collision of the vehicle 112 with the obstacle, so as to remove the gap between the passenger 202 and the seat 204. Thus, since the passenger 202 has been already restrained to the seat 204 before the collision of the vehicle 112 with the obstacle, the shock to the passenger 202 can be alleviated.

Figure 3:
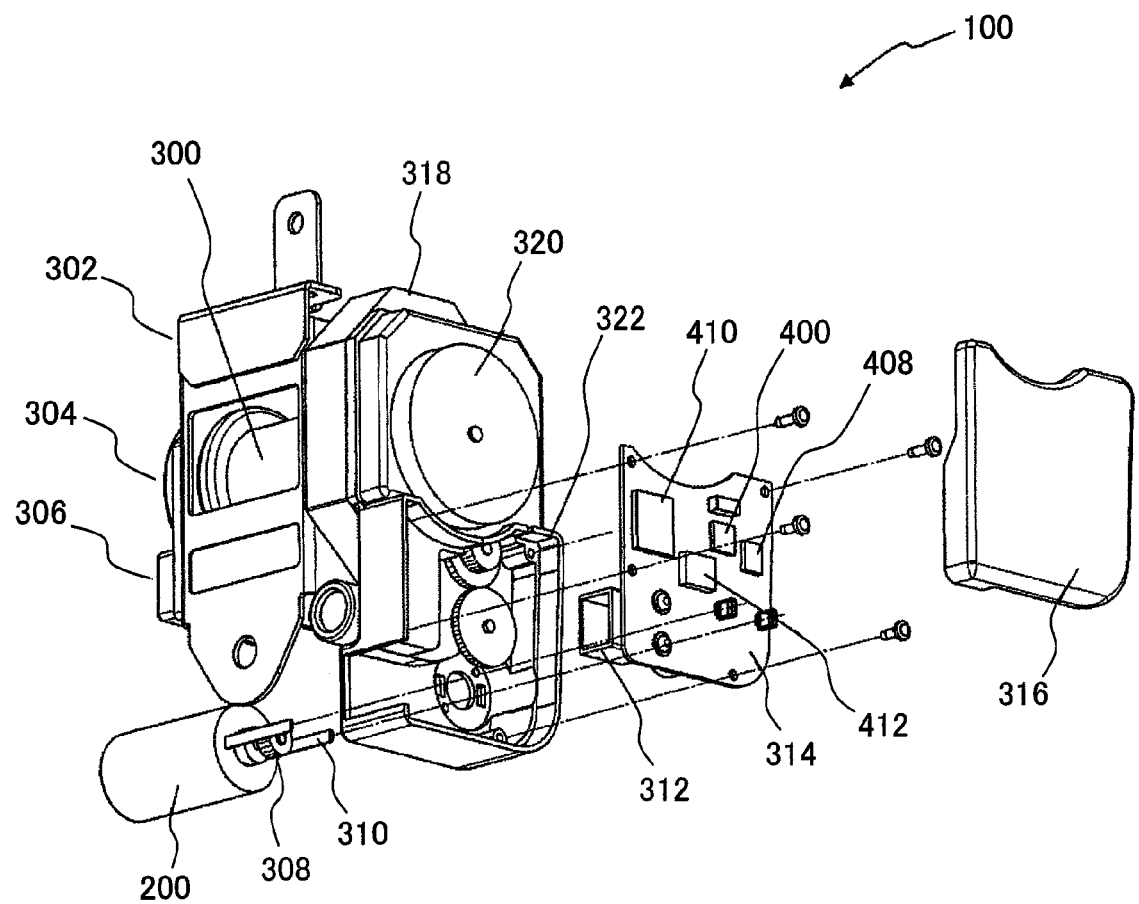
FIG. 3 is an exploded perspective view showing the configuration of a seat belt retractor according to one embodiment of the present invention.

Referring now to FIG. 3, the configuration of the seat belt retractor of the present embodiment is described below.

FIG. 3 is an exploded perspective view showing the configuration of the seat belt retractor according to one embodiment of the present invention. The same reference numerals as those in FIGS. 1 and 2 denote the same parts.

The electro-mechanically integrated seat belt retractor 100 is provided with a spool 300 around which the seat belt 206 (illustrated in FIG. 2) is wound, and a frame 302 that holds the spool 300 in a shaft direction. The frame 302 is provided with lock mechanism 304 to lock the seat belt 206 in emergency so as not to be released from the spool 300. The lock mechanism 304 includes a speed detection unit 306 fitted thereto, which detects a rotational speed of the spool 300 and activates the lock mechanism 304.

On the opposite side of the lock mechanism 304 with reference to the spool 300, a pre-tensioner unit 318 and a return spring 320 are placed. The return spring 320 has a rotational shaft configured so as to rotate in synchronization with a rotational shaft of the spool 300. Between the motor 200 and the spool 300, a motor power transmission mechanism unit 322 is provided that transmits a rotational power of the motor 200 to the spool 300. The motor power transmission mechanism unit 322 is formed with a plurality of spur gears. A motor gear 308 fixed to an output shaft of the motor 200 engages with one of the spur gears (a first gear) of the motor power transmission mechanism unit 322.

In the illustrated example, the motor power transmission mechanism unit 322 is made up of two spur gears. Herein, if a distance between a center shaft of the motor gear 308 and a center shaft of the first gear engaging with the motor gear 308 has an error with reference to a predetermined dimension, then the torque transmitted from the motor 200 to the first gear will have an error with reference to a predetermined transmission torque. Such an error is generated between the first gear and a second gear and between the second gear and a gear of the spool 300 as well. Such an individual difference of efficiency in the motor power transmission mechanism unit 322 becomes one of the factors causing an error of the winding torque.

A control circuit board 314 is disposed in parallel with a rotational face of the spool 300. The control circuit board 314 includes a microcomputer 400, a motor driving circuit 410, and a nonvolatile memory 408 mounted therein, where the microcomputer 400 can conduct 8-bit or 16-bit calculation, and the motor driving circuit 410 supplies electrical power to the motor 200 via a motor terminal 310. On the control circuit board 314, a connector for vehicle 312 is mounted, through which electrical power is supplied to the control circuit board from a battery or an instruction signal is input from the collision-judgment controller 106. On the control circuit board 314, a current sensor circuit 412 is further provided, which detects a current flowing through the motor 200.

The control circuit board 314 and the motor 200 may be electrically connected by fixing a wire to the control circuit board 314 and the motor terminal 310 with solder or by, instead of solder, using a relay terminal with both ends formed in a female shape. In order to suppress electrical noise generated from the motor 200, it is useful to shorten the wire length between the control circuit board 314 and the motor 200, and the relay terminal is preferably used for this purpose. To protect the control circuit board 314 from disturbance such as waterdrops, a cover 316 is provided outside of the control circuit board 314.

Figure 4:
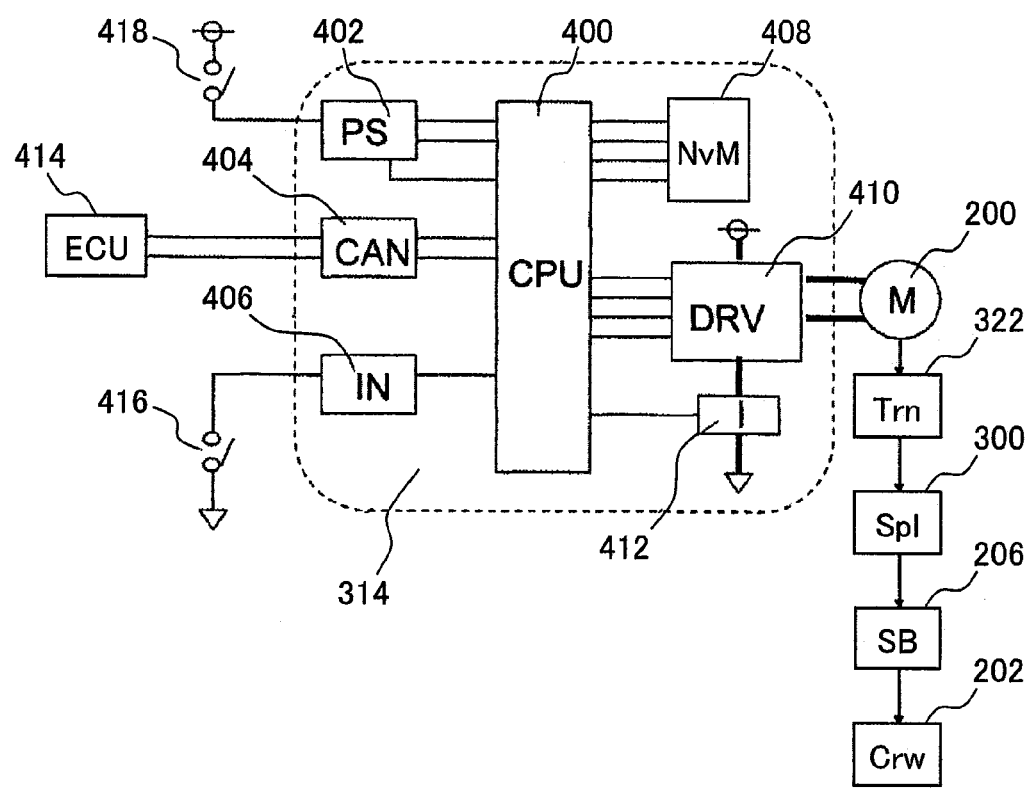
FIG. 4 is a block diagram showing the configuration of a seat belt winding system including a seat belt retractor according to one embodiment of the present invention.

Referring now to FIG. 4, the configuration of a seat belt winding system including the seat belt retractor of the present embodiment is described below.

FIG. 4 is a block diagram showing the configuration of the seat belt winding system including the seat belt retractor according to one embodiment of the present invention. The same reference numerals as those in FIGS. 1 to 3 denote the same parts.

When an ignition switch 418 is turned on for electrical continuity, a vehicle battery voltage (9V to 16V) is supplied to a power supply circuit 402 in the control circuit board 314. The power supply circuit 402 generates a driving voltage (5V) from the vehicle battery voltage, the driving voltage being supplied to a signal element such as the microcomputer 400. The power supply circuit 402 is electrically connected with the microcomputer 400, thus having a function of receiving a signal from the microcomputer 400 regularly to monitor the operation of the microcomputer 400 or of generating a signal to reset the microcomputer 400 when the power supply voltage is lowered.

The microcomputer 400 is further electrically connected with a CAN communication circuit 404 and an input interface circuit 406, where the CAN communication circuit 404 serves as an interface with another ECU 414, and the input interface circuit 406 judges a buckle switch restraining state of the seat belt 206. The microcomputer 400 is still further electrically connected with the nonvolatile memory 408, the motor driving circuit 410, and the current sensor circuit 412, where the nonvolatile memory 408 stores data, the motor driving circuit 410 supplies a current to the motor 200, and the current sensor circuit 412 measures a motor current.

The motor driving circuit 410 includes a H-bridge made up of MOSFETs, and has a function of supplying electrical power to the motor 200 in accordance with an instruction signal from the microcomputer 400 such as normal rotation and reverse rotation. The motor 200 converts the electric power supplied from the motor driving circuit 410 into a rotational torque. The rotational torque generated by the motor 200 is amplified in the torque value and is transmitted to the spool 300 via the motor power transmission mechanism unit 322, which finally serves as a restraining force of the seat belt 206 that restrains the passenger 202 to the seat 204 (illustrated in FIG. 2).

Figure 5:
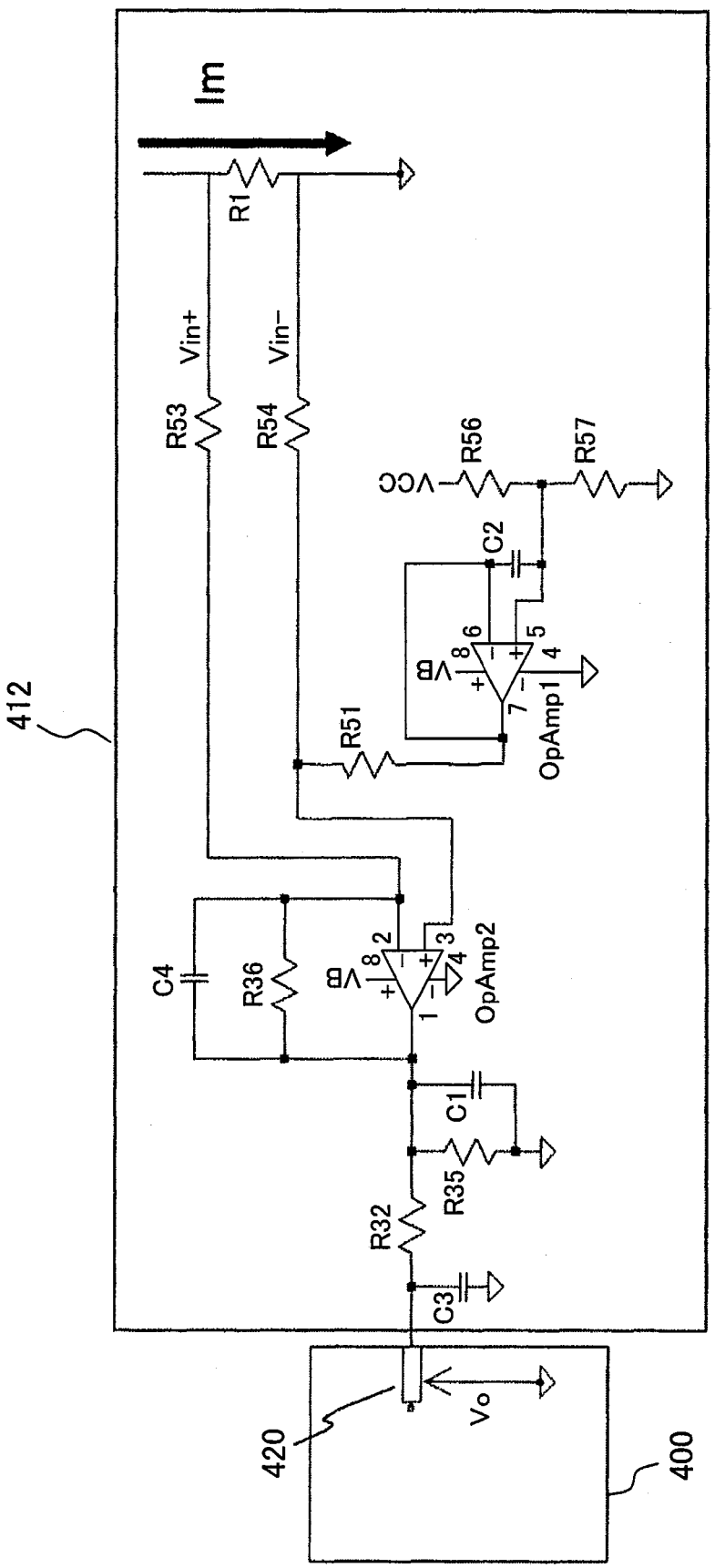
FIG. 5 is a circuit diagram showing the configuration of a current sensor circuit used for a seat belt retractor according to one embodiment of the present invention.

Referring now to FIG. 5, the configuration of the current sensor circuit 412 used for the seat belt retractor of the present embodiment is described below.

FIG. 5 is a circuit diagram showing the configuration of the current sensor circuit used for the seat belt retractor according to one embodiment of the present invention. The same reference numerals as those in FIGS. 1 to 4 denote the same parts.

A motor current Im flowing through a shunt resistor R1 generates a potential difference across the shunt resistor R1. The potential difference generated across the shunt resistor R1 is input to an amplifier OpAmp2 via resistors R53 and R54, is amplified by the amplifier OpAmp2, and then is input to an analogue terminal 420 of the microcomputer 400. The amplifier OpAmp2 is connected with a feed-back resistor R36 and a feed-back capacitor C4. On an output side of the amplifier OpAmp2, resistors R35 and R32 and capacitors C1 and C3 are connected as illustrated in the drawing.

An amplifier OpAmp1 is provided so as to generate an offset voltage. The amplifier OpAmp1 determines an output voltage from the current sensor circuit 412 when the motor current Im does not flow. This offset voltage is set so as to judge an abnormal state and a normal state of the resistors and the capacitors making up the current sensor circuit 412, and for example, in the normal state, the output voltage from the current sensor circuit 412 will be $5V \times (R57/(R56+R57))$ when the motor current Im is 0 A. However, when the resistor R36 breaks due to a short, the output voltage from the current sensor circuit 412 will be 0V, so that the abnormal state can be judged for the circuit components of the current sensor circuit 412.

The output voltage Vo from the current sensor circuit 412 can be calculated by the following Expression (1) using the motor current Im:

[Expression 1]

$$Vo = \frac{1}{R36 \times \left(\frac{1}{R54} + \frac{1}{R51}\right)^{-1}} \left\{ \left(\frac{1}{R51} + \frac{1}{R54}\right) \times IB^- - \left(\frac{1}{R53} + \frac{1}{R36}\right) \times \left(IB^+ + \frac{R1 \times I_{motor}}{R54} - \frac{Vd}{R51}\right) + \left(\frac{1}{R53} + \frac{1}{R36}\right) \times \left(\frac{1}{R54} + \frac{1}{R51}\right) \times Voff \right\} \quad (1)$$

$$\text{wherein } Vd = \frac{R57}{R56 + R57} \times Vcc$$

In Expression (1), IB+, IB−, Voff represent an input bias current at noninverting input terminals of the amplifiers OpAmp1 and OpAmp2, an input bias current at inverting input terminals, and an input offset voltage, respectively. Imotor represents the motor current Im.

The ideal state desirably is free from a variation in the respective resistance values of Expression (1) for each product and any error factors for the amplifiers (input bias current and input bias voltage). Actual products, however, have an output value Vo with characteristics values varying individually because of variations in the resistor values and the characteristics of the amplifiers (input bias current and input bias voltage), and there is a deviation from a current value to be detected.

This error of the current sensor circuit 412 causes a factor for an error of the winding torque.

Figure 6:
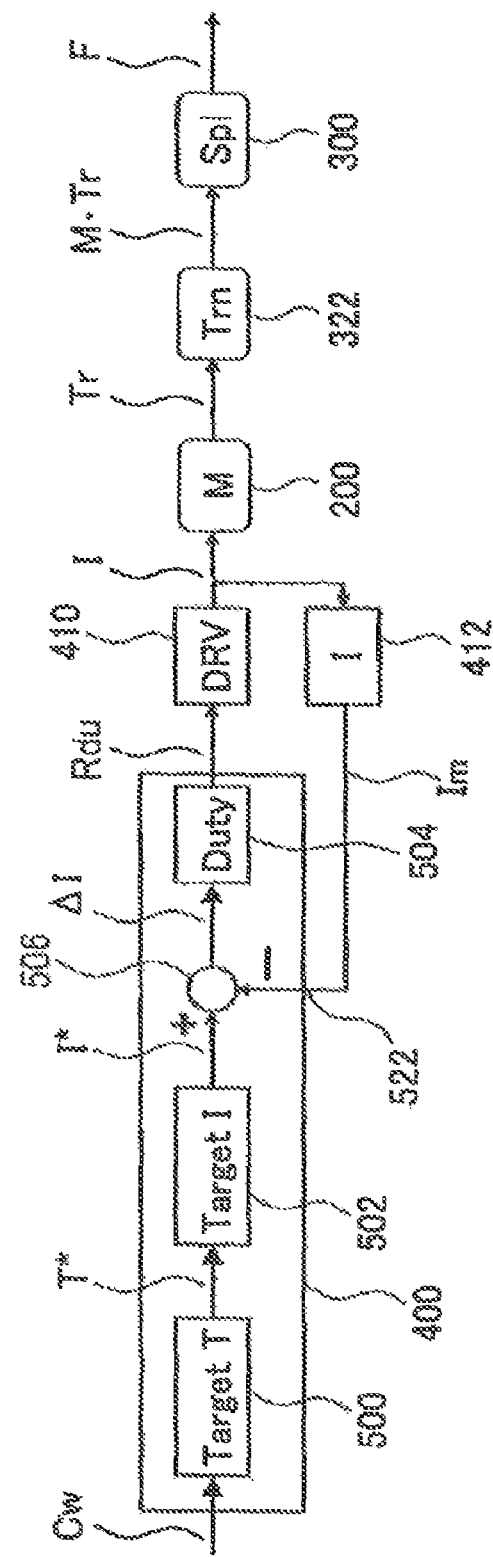
FIG. 6 is a control block diagram of a seat belt retractor according to one embodiment of the present invention.

Referring now to FIG. 6, the following describes control blocks of the seat belt retractor of the present embodiment.

FIG. 6 is a control block diagram showing the seat belt retractor according to one embodiment of the present invention. The same reference numerals as those in FIGS. 1 to 5 denote the same parts.

The microcomputer 400 includes a target torque calculation unit 500, a target current calculation unit 502, a Duty ratio calculation unit 504, and a subtraction unit 506.

Immediately before the collision of the vehicle 112 with the obstacle, the target torque calculation unit 500 determines a predetermined target torque T* in accordance with a seat belt winding instruction Cw transmitted from the collision-judgment controller 106 of FIG. 1. The target current calculation unit 502 calculates a target current I* based on the target torque T*.

Herein, the target current calculation unit 502 finds a relationship (apparent torque constant for each product) between the motor current Im and the seat belt winding torque Tw measured for each product in advance, and calculates the target current I* based on the apparent torque constant for each product using the following expression (2):

Target current value I*=target torque T*/apparent torque constant for each product    (2).

Herein, the "apparent torque constant for each product" represents a relationship between the seat belt winding torque Tw and the measured current Im. This constant may be stored in the nonvolatile memory 408 mounted on the control circuit board 314 when the electro-mechanically integrated seat belt retractor 100 is assembled or when the electro-mechanically integrated seat belt retractor 100 is subjected to a shipping inspection in the manufacturing line, and the constant is different for each product. When the control circuit board 314, the current sensor circuit 412, the motor 200, and the motor power transmission mechanism unit 322 are uniquely determined, and are assembled as the electro-mechanically integrated seat belt retractor 100, then the above-stated correction can be executed thereto. Therefore, once the "apparent torque constant for each product" is recorded in the nonvolatile memory 408, such an "apparent torque constant for each product" can be effective over a life length of the product because the combination of the control circuit board 314, the current sensor circuit 412, the motor 200, and the motor power transmission mechanism unit 322 is not changed, thus making it possible to control the seat belt winding torque Tw more precisely.

The method for measuring the apparent torque constant for each product will be described later with reference to FIG. 9 or later.

The subtraction unit 506 calculates a difference (a current deviation ΔI) between the target current I* and the measured current In detected by the current sensor circuit 412. Then, current feed-back is conducted so as to decrease the current deviation ΔI.

The Duty ratio calculation unit 504 calculates a Duty ratio Rdu based on the current deviation ΔI. PID control or P control may be used for the calculation.

Based on the output from the Duty ratio calculation unit 504, the motor driving circuit 410 supplies a current I to the motor 200. The motor 200 converts the electrical power supplied from the motor driving circuit 410 into a rotational torque Tr. The rotational torque Tr generated by the motor 200 is amplified M-fold by the motor power transmission mechanism unit 322 to be a rotational torque M×Tr. Then, the rotational torque is transmitted to the spool 300, and finally serves as a restraining force F of the seat belt 206 that restrains the passenger 202 to the seat 204 (illustrated in FIG. 2).

Note that conventionally the target current calculation unit 502 finds a relationship (typical torque constant) between a motor current Im and a seat belt winding torque Tw measured using a product with typical characteristics in advance, and calculates a target current I* using the following expression (3) based on the typical torque constant:

Target current value I*=target torque T*/typical torque constant    (3).

In this way, conventionally the target current value I* is decided using the typical torque constant, and therefore when the torque constant of the motor 200 and the efficiency of the motor power transmission mechanism unit vary, that is, when the torque constant varies among products, the seat belt winding torque Tw will include an error even when the current deviation ΔI can be made zero by current feed-back.

On the other hand, in the present embodiment, the target current calculation unit 502 calculates the target current value I* using torque characteristics different for each product, and therefore even when the torque constant of the motor 200 and the efficiency of the motor power transmission mechanism unit vary, the variation can be corrected, thus making it possible to control the seat belt winding torque Tw more precisely.

Such processing by the target current calculation unit 502 further can correct an error in the current sensor circuit 412, which will be described below with reference to FIG. 7.

Referring now to FIG. 7, the following describes error correction for output torque in the seat belt retractor of the present embodiment.

FIG. 7 explains the error correction for the output torque in the seat belt retractor according to one embodiment of the present invention.

FIG. 7 shows output torque variations among control circuit boards 314 and mechanism units including the combination of a motor 200 and a motor power transmission mechanism unit 322. In Case 1 including the combination of a current sensor A and a mechanism unit A, a detection error of the current sensor circuit 412 is +5%, which is detected as 5% over-current with reference to the actual motor current 514. However, the torque constant is 1.05 with reference to the standard value of 1.00, and therefore the apparent torque constant will be 1.00, thus being free from an error with reference to the standard value of 1.00.

Similarly, in Case 2 including the combination of a current sensor B and a mechanism unit B, a detection error of the current sensor circuit 412 is −5%, which is detected as 5% under-current with reference to the actual motor current 514. However, the torque constant is 0.95 with reference to the standard value of 1.00, and therefore the apparent torque constant will be 1.00, thus being free from an error with reference to the standard value of 1.00.

However, it is unusual that the detection error of the current sensor circuit 412 can be cancelled by the torque constant of the mechanism unit as above. In many cases, as in Case 3 or Case 4, a measurement error of the current sensor circuit 412 and a variation in the torque constant of the mechanism unit affect so that the error increases more. For instance, as in Case 3 including the combination of the current sensor A and the mechanism unit B, the detection error of the current sensor circuit 412 is +5%, which is detected as 5% over-current with reference to the actual motor current 514. However, since the torque constant is 0.95 with reference to the standard value of 1.00, the apparent torque constant will be 0.90, resulting in the generation of an error of −10% with reference to the standard value of 1.00. In Case 5, the detection error of the current sensor circuit 412 is 0% because the error of the current sensor circuit 412 is corrected by the conventional method. However, since the torque constant is 1.05 with reference to the standard value of 1.00, the apparent torque constant will be 1.05, resulting in the generation of an error of +5% with reference to the standard value of 1.00.

According to the present embodiment, however, since the apparent torque constant is measured for each product, which is used to calculate the target current I*, an error generated in the output torque can be reliably corrected in any combination of FIG. 7.

Herein, the apparent torque constant for each product enables the correction of all errors in FIG. 7, including the error of the current sensor circuit 412, the individual difference of the torque constant among motors, and the individual difference of efficiency in the motor power transmission mechanism unit 322. However, the error of the current sensor circuit 412 only may be corrected, for example.

Figure 8:
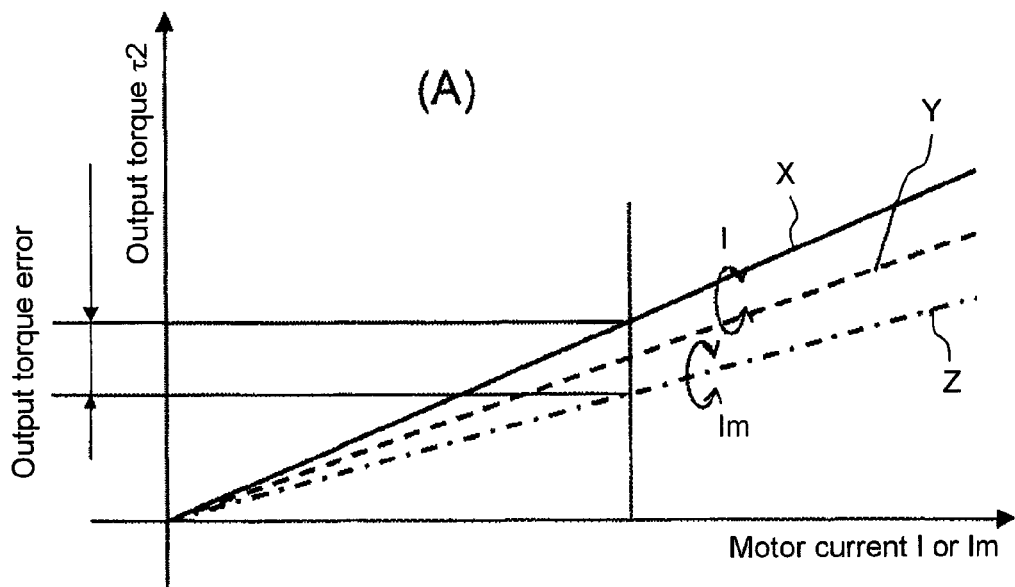
FIG. 8 explains an apparent torque constant used for a seat belt retractor according to one embodiment of the present invention.
Figure 8:
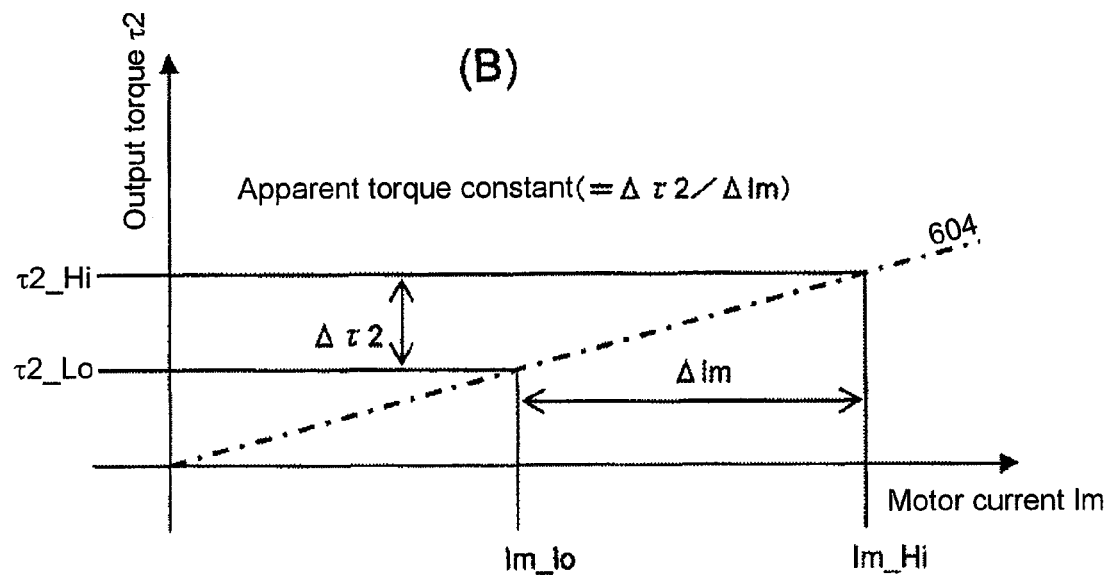

Referring now to FIG. 8, the following describes an apparent torque constant used for the seat belt retractor of the present embodiment.

FIG. 8 explains the apparent torque constant used for the seat belt retractor according to one embodiment of the present invention.

FIG. 8A shows a relationship between the motor current and the output torque. Herein, the output torque refers to any one of a motor output torque 516, a motor power transmission mechanism unit output torque 518, and a seat belt winding torque Tw. In the ideal state where the current sensor circuit 412, the torque constant of the motor 200, and the efficiency of the motor power transmission mechanism unit are free from variations, the output torque shows a relationship indicated by the solid line X with reference to the motor current I.

On the other hand, in the actual condition where the torque constant of the motor 200 and the efficiency of the motor power transmission mechanism unit have variations, the output torque has a relationship indicated by the dotted lines Y with reference to the motor current I.

When the output torque is shown in the graph with the horizontal axis representing the measured current Im, the output torque has a relationship indicated by the alternate long and short dash lines z with reference to the measured current Im because variations in the resistance of the current sensor circuit 412 and the characteristics of the amplifiers (input bias current and input bias voltage) affect thereon.

Herein, as shown in FIG. 8B, the apparent torque constant corresponds to the gradient of a chain line 604, which can be calculated using the following expression (4):

$$\text{Apparent torque constant} = \Delta\tau 2 / \Delta Im \qquad (4).$$

Figure 9:
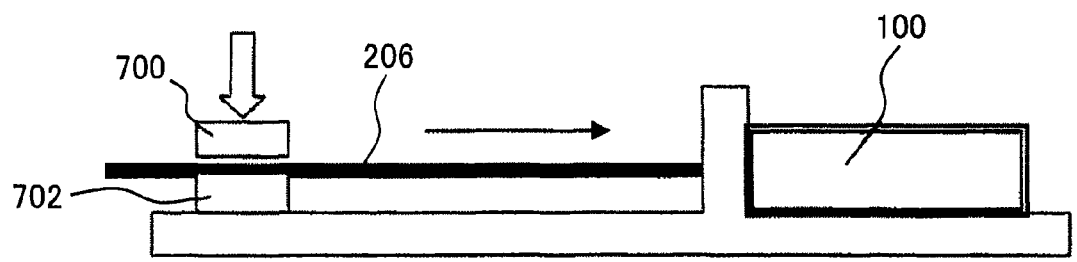
FIG. 9 is a side view of a calibration device used for a seat belt retractor according to one embodiment of the present invention.
Figure 10:
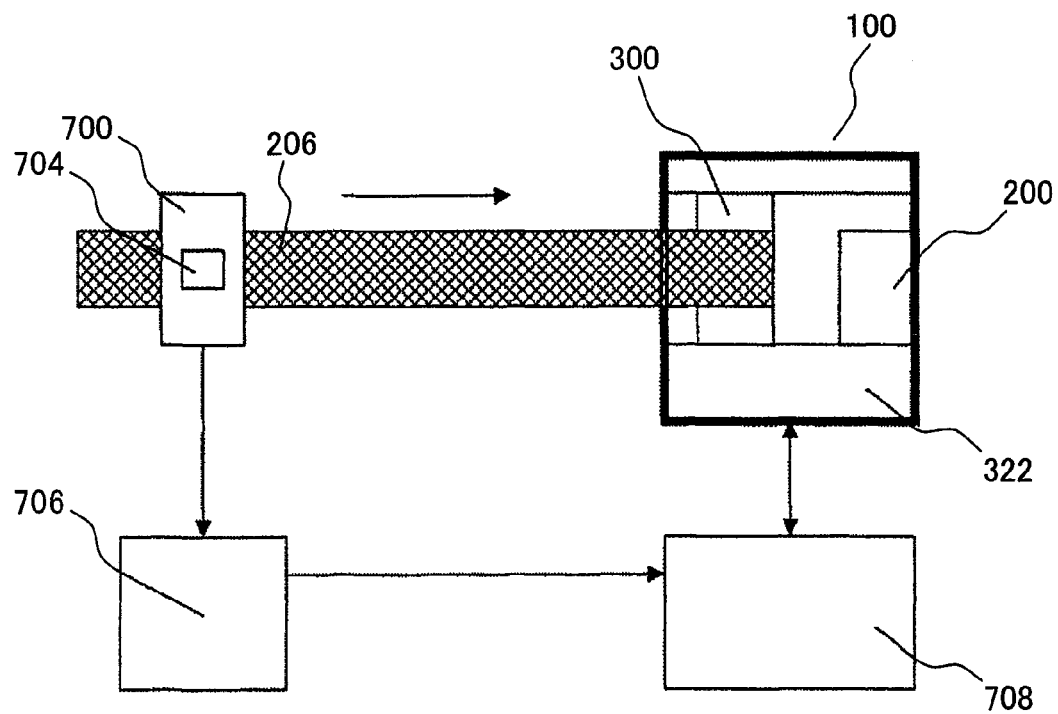
FIG. 10 is a plan view of the calibration device used for the seat belt retractor according to one embodiment of the present invention.

Referring now to FIGS. 9 and 10, the following describes a calibration device used for the seat belt retractor of the present embodiment.

FIG. 9 is a side view of the calibration device used for the seat belt retractor according to one embodiment of the present invention. FIG. 10 is a plan view of the calibration device used for the seat belt retractor according to one embodiment of the present invention.

The calibration device shown in FIGS. 9 and 10 is used at the product assembly line of the seat belt retractor according to the present embodiment. The calibration device is used for finding the above-stated "apparent torque constant", which is stored in the nonvolatile memory 408 mounted in the control circuit board 314.

As shown in FIG. 9, the electromechanically integrated seat belt retractor 100 is attached to the retractor calibration device, and the seat belt 206 is taken out along the calibration device. The seat belt 206 is completely fixed between a seat belt restraining tool 700 and a seat belt restraining tool 702.

Then, as shown in FIG. 10, an inspection device 708 such as a PC is connected with the electro-mechanically integrated seat belt retractor 100 via a communication line, so that the electro-mechanically integrated seat belt retractor 100 drives the motor 200 in accordance with a seat belt driving instruction Cw from the PC, thus causing the spool 300 around which the seat belt 206 is wound to rotate via the motor power transmission mechanism unit 322. In accordance with the rotation of the spool 300, the seat belt 206 taken out over the retractor calibration device moves toward the electromechanically integrated seat belt retractor 100. However, since the seat belt 206 is restrained by the seat belt restraining tool 700 and the seat belt restraining tool 702, the seat belt restraining tool 700 deforms due to its own distortion. Using a distortion gauge 704 provided on a surface of the seat belt restraining tool 700, the deformation amount of the seat belt restraining tool 700 is measured, whereby the inspection device 708 such as a PC can measure the seat belt winding torque Tw generated at the seat belt 206. At the same time, a voltage in accordance with the motor current Im is output to the current sensor circuit 412 mounted in the control circuit board 314. This measured current value Im is transmitted to the inspection device 708 such as a PC via CAN communication, for example.

The inspection device 708 such as a PC fetches the seat belt winding torque Tw and the measured current value Im so that they are in synchronization with each other, and calculates the "apparent torque constant" using Expression (4).

Herein, two types of driving instructions are used as the seat belt driving instruction Cw from the PC. For instance, a first instruction may be a driving instruction with the Duty of 5%, and a second instruction may be a driving instruction with the Duty of 80%. The driving instruction with the Duty of 5% corresponds to the motor current In_lo in FIG. 8B, and the seat belt winding torque Tw at this time (output torque τ2_Lo in FIG. 8B) is measured. The driving instruction with the Duty of 80% corresponds to the motor current Im_Hi in FIG. 8B, and the seat belt winding torque Tw at this time (output torque τ2_Hi in FIG. 8B) is measured. Then, using Expression (4), the "apparent torque constant" can be calculated.

The inspection device 708 such as a PC sends the "apparent torque constant" to the control circuit board 314 via CAN communication, for example, and the "apparent torque constant" is stored in the nonvolatile memory 408 via the microcomputer 400 on the control circuit board 314.

Figure 11:
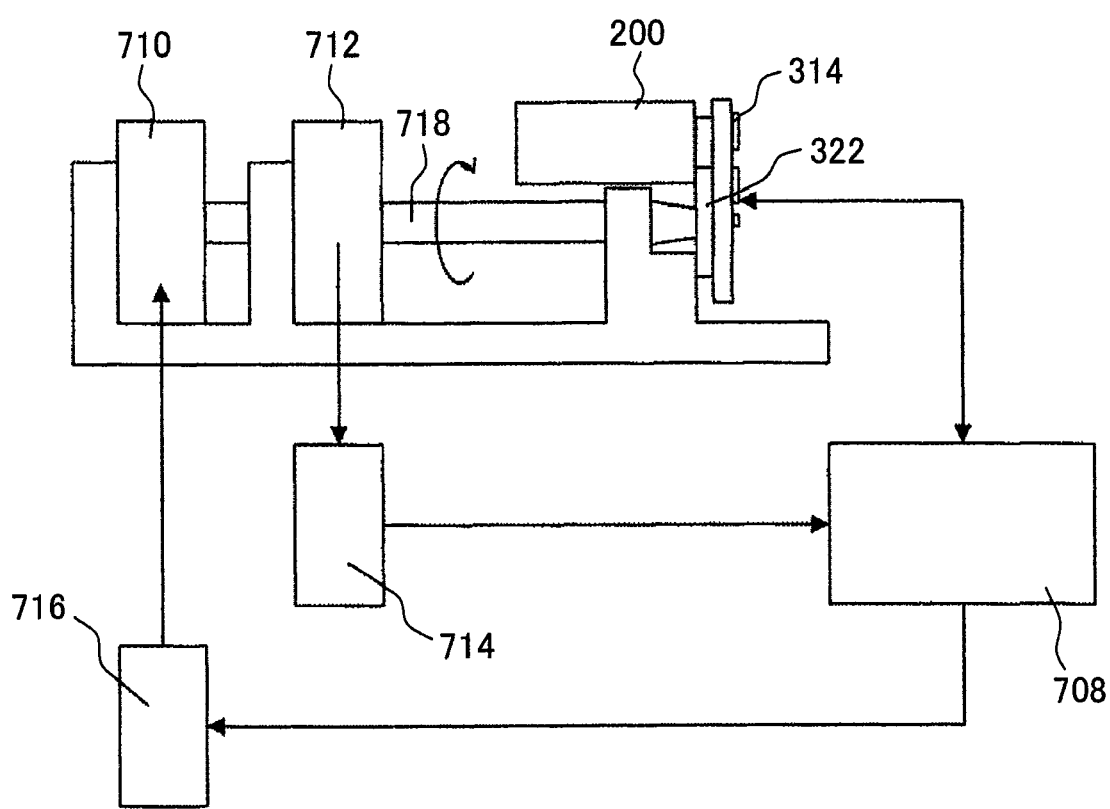
FIG. 11 is a side view of another calibration device used for a seat belt retractor according to one embodiment of the present invention.

Referring now to FIG. 11, the following describes another calibration device used for the seat belt retractor of the present embodiment.

FIG. 11 is a side view of another calibration device used for the seat belt retractor according to one embodiment of the present invention. The same reference numerals as those in FIGS. 9 and 10 denote the same parts.

FIG. 11 shows a calibration device with a more simplified configuration. During the manufacturing process of the electro-mechanically integrated seat belt retractor, calibration is conducted thereto after the motor 200, the control circuit board 314, and the motor power transmission mechanism unit 322 are mutually assembled,. In this case, although the seat belt 206 is not attached thereto, a rotational shaft 718 provided in the calibration device is made to engage with an output stage of the motor power transmission mechanism unit 322, and brake torque generated at a brake 710 is measured by a torque sensor 712, whereby the motor power transmission mechanism unit output torque 518 can be detected. Further, a voltage in accordance with the motor current Im is generated in the current sensor circuit 412 mounted on the control circuit board 314. This voltage value, i.e., the measured current value Im is sent to the inspection device 708 such as a PC via CAN communication, for example. The inspection device 708 such as a PC fetches the motor power transmission mechanism unit output torque 518 and the measured current value Im so that they are in synchronization with each other, and calculates the "apparent torque constant" using Expression (4).

Figure 12:
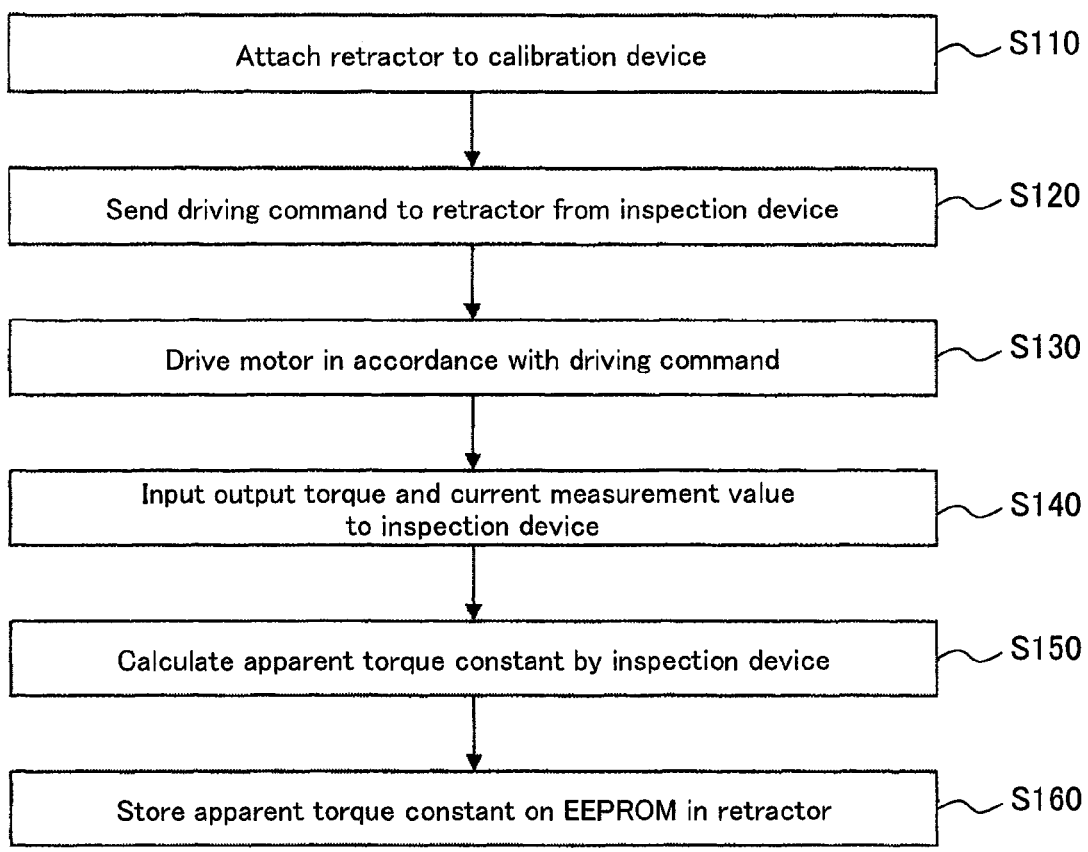
FIG. 12 is a flowchart showing calibration in a seat belt retractor according to one embodiment of the present invention.

Referring now to FIG. 12, the following describes the calibration in the seat belt retractor of the present embodiment.

FIG. 12 is a flowchart showing the calibration in the seat belt retractor according to one embodiment of the present invention.

At Step S110, an operator of the calibration device attaches the seat belt retractor to the calibration device.

Next, at Step S120, the inspection device sends a driving command to the seat belt retractor. As the driving command, a seat belt driving instruction Cw used in actual cars or a pseudo-instruction prepared for calibration purpose may be used. In any case, in order to find the "apparent torque constant", the driving command is set so that two types of torque values can be obtained.

Next, at Step S130, the electro-mechanically integrated seat belt retractor 100 drives the motor 200 in accordance with the driving command. The rotational direction of the motor 200 has to be switched between normal rotation and reverse rotation, as required.

Next, at Step S140, the torque measured by the distortion gauge 704 and the measured current value Im sent from the electro-mechanically integrated seat belt retractor 100 are input to the inspection device so that they are in synchronization with each other, and the inspection device calculates the apparent torque constant.

Next, at Step S150, the inspection device sends the calculated "apparent torque constant" to the electro-mechanically integrated seat belt retractor 100 via communication means such as CAN communication. The microcomputer 400 assembled in the electro-mechanically integrated seat belt retractor 100 stores the "apparent torque constant" received from the inspection device on the nonvolatile memory 408 mounted on the control circuit board 314.

In the actual use state in a vehicle, the electro-mechanically integrated seat belt retractor 100 is turned on, followed by the start-up of the microcomputer 400, and then the "apparent torque constant" stored in the nonvolatile memory 408 is read out into a RAM of the microcomputer 400, thus controlling the seat belt in accordance with the control block diagram of FIG. 6.

As described above, according to the present embodiment, errors of electric circuits and mechanism components in the electro-mechanically integrated seat belt retractor can be corrected individually using a nonvolatile memory, whereby the control accuracy for the seat belt winding torque can be improved. Thus, the winding torque can be controlled within a predetermined range.

What is claimed is:

1. A control module for a seat belt retractor that includes a winding mechanism having a rotational shaft that winds a seat belt for a vehicle; a motor that generates a power to rotate the rotational shaft; and a gear mechanism that mechanically couples the motor with the rotational shaft, the control module comprising:
    a control unit that controls motor current that flows through the motor using a preset control parameter value;
    a change unit that changes, based on the motor current and an output torque value of the rotational shaft, the preset control parameter value; wherein,
    the control module further includes a current sensor;
    the control unit takes feed-back control of the motor current so as to reduce a difference between a target current calculated based on a target torque for the motor and the motor current detected by the current sensor;
    the preset control parameter value comprises an apparent torque constant for each of a plurality of seat belt retractors; and
    the control unit calculates the target current, based on the target torque and the apparent torque constant for each of the seat belt retractors.

2. The control module for seat belt retractor according to claim 1,
    wherein the apparent torque constant for each of the seat belt retractors corrects a variation in each of a plurality of current sensors making up the seat belt retractor.

3. The control module for seat belt retractor according to claim 2,
    wherein the apparent torque constant for each of the seat belt retractors further corrects an individual difference of a torque constant of the motor and an individual efficiency difference of the gear mechanism making up the seat belt retractor.

* * * * *